United States Patent Office 3,424,140
Patented Jan. 28, 1969

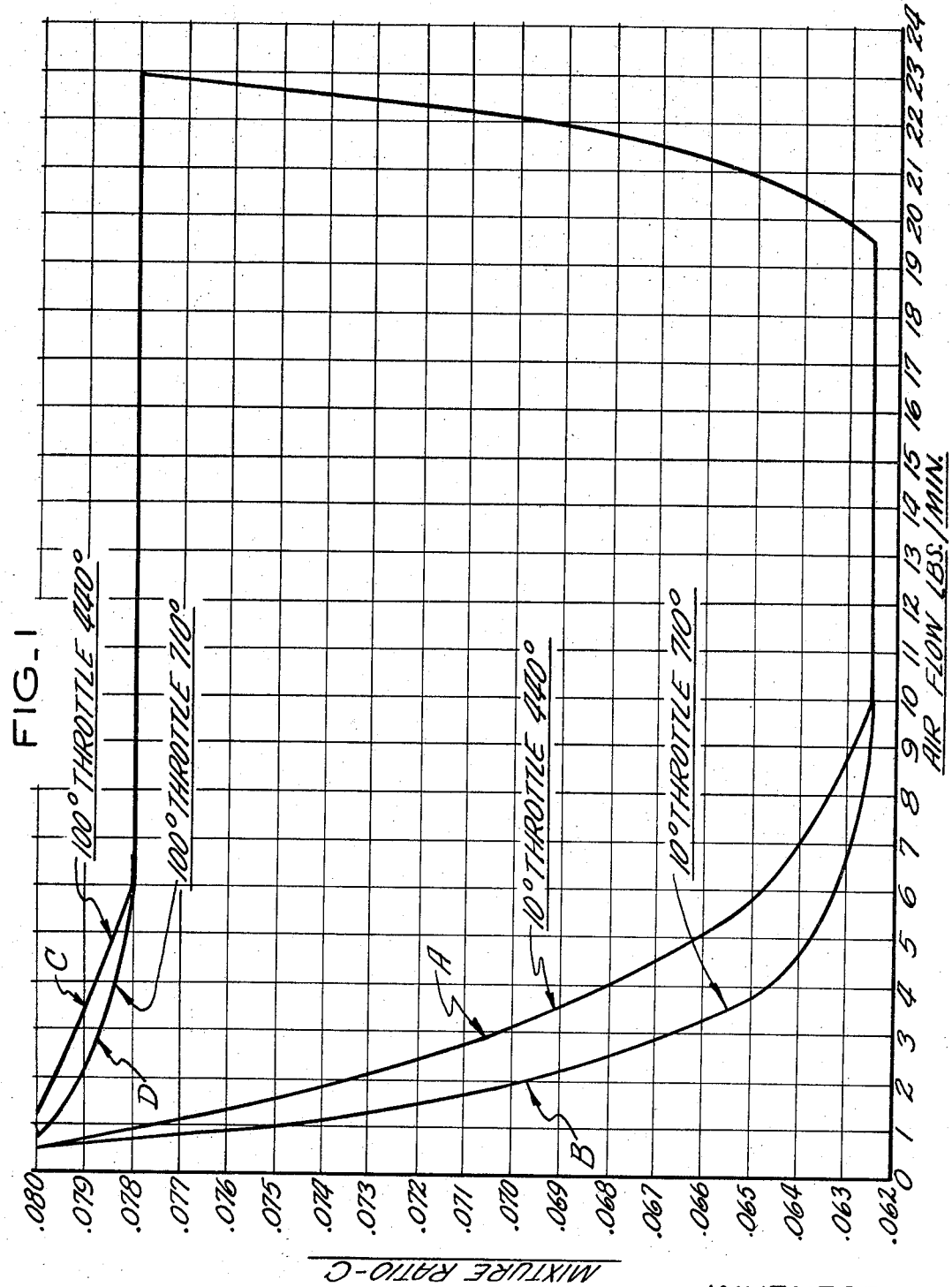

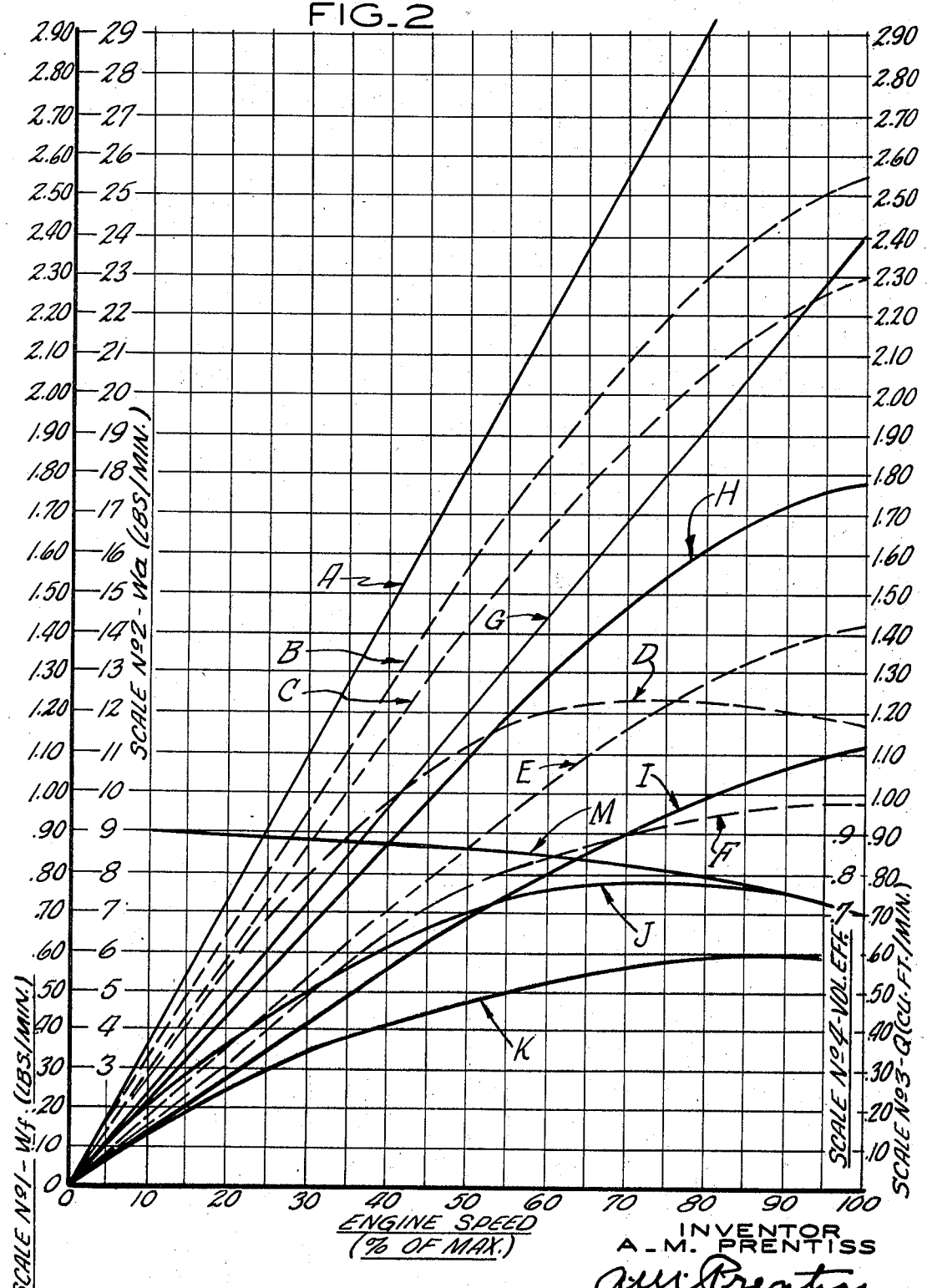

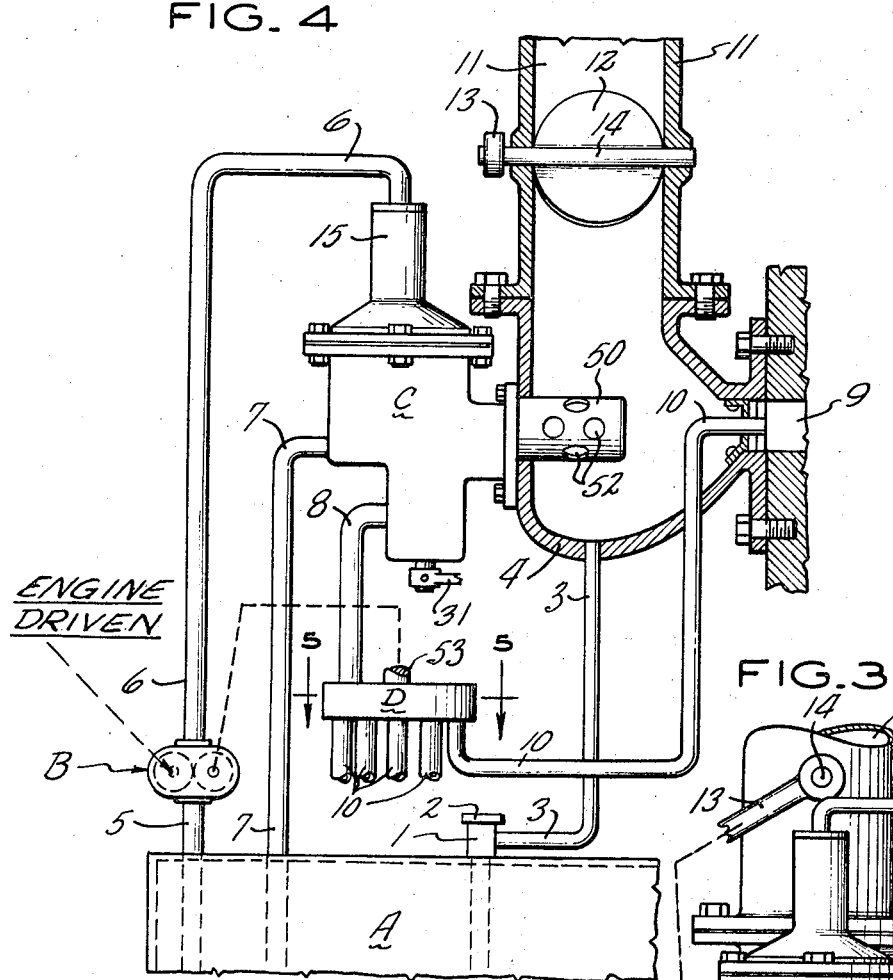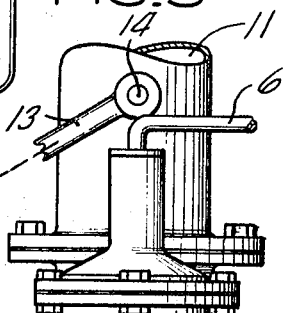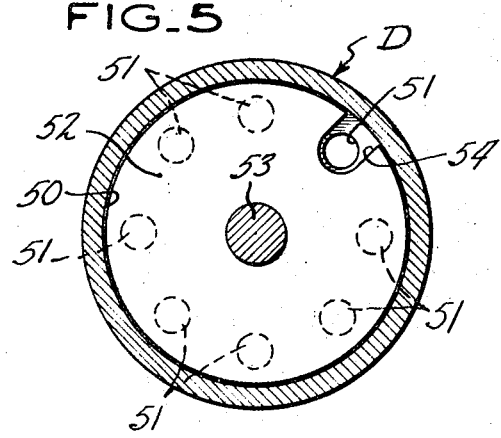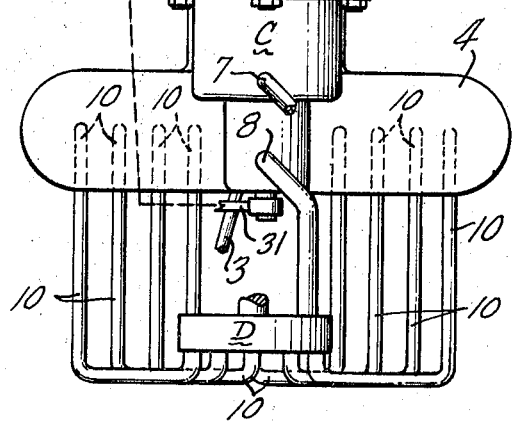

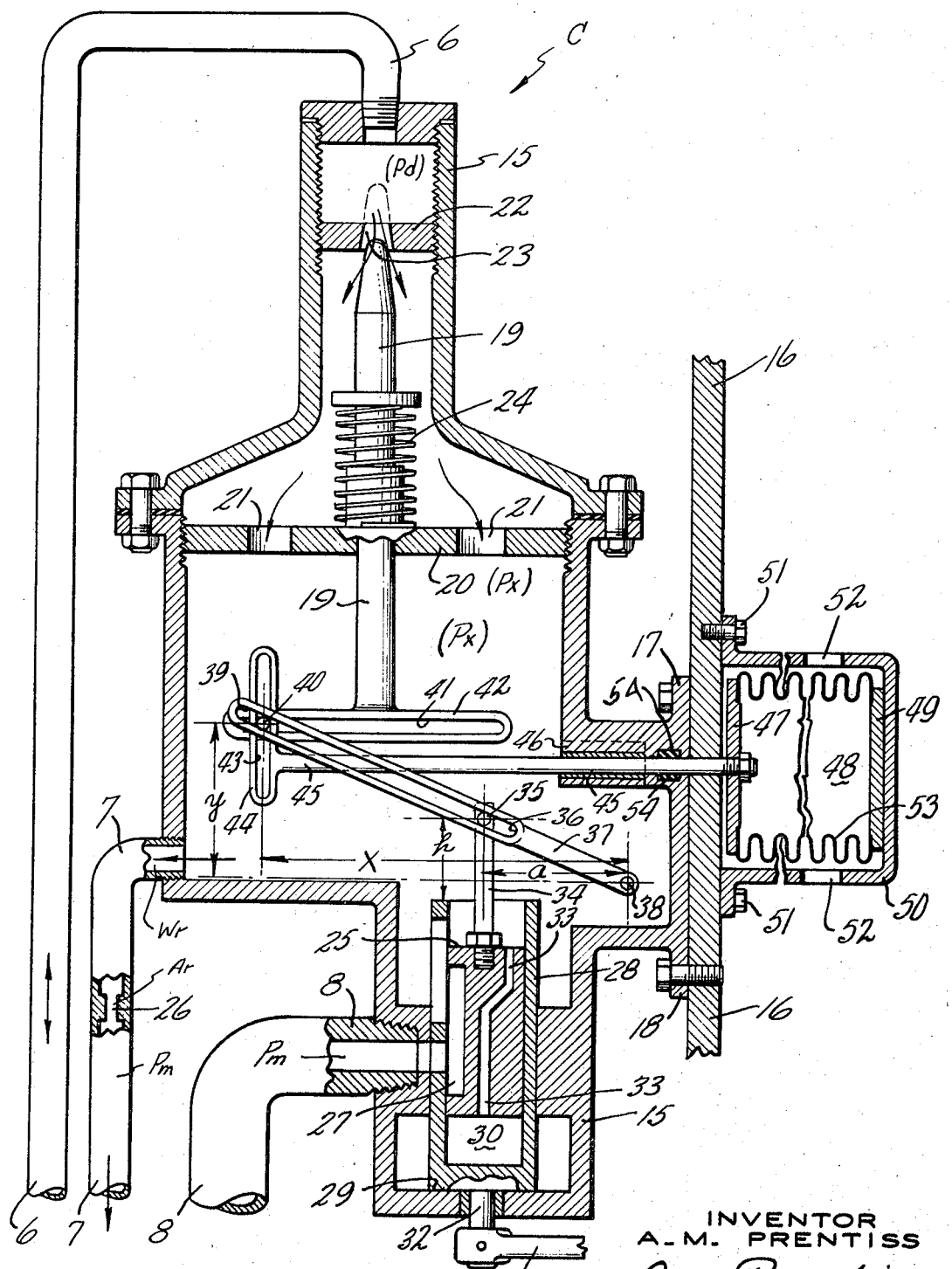

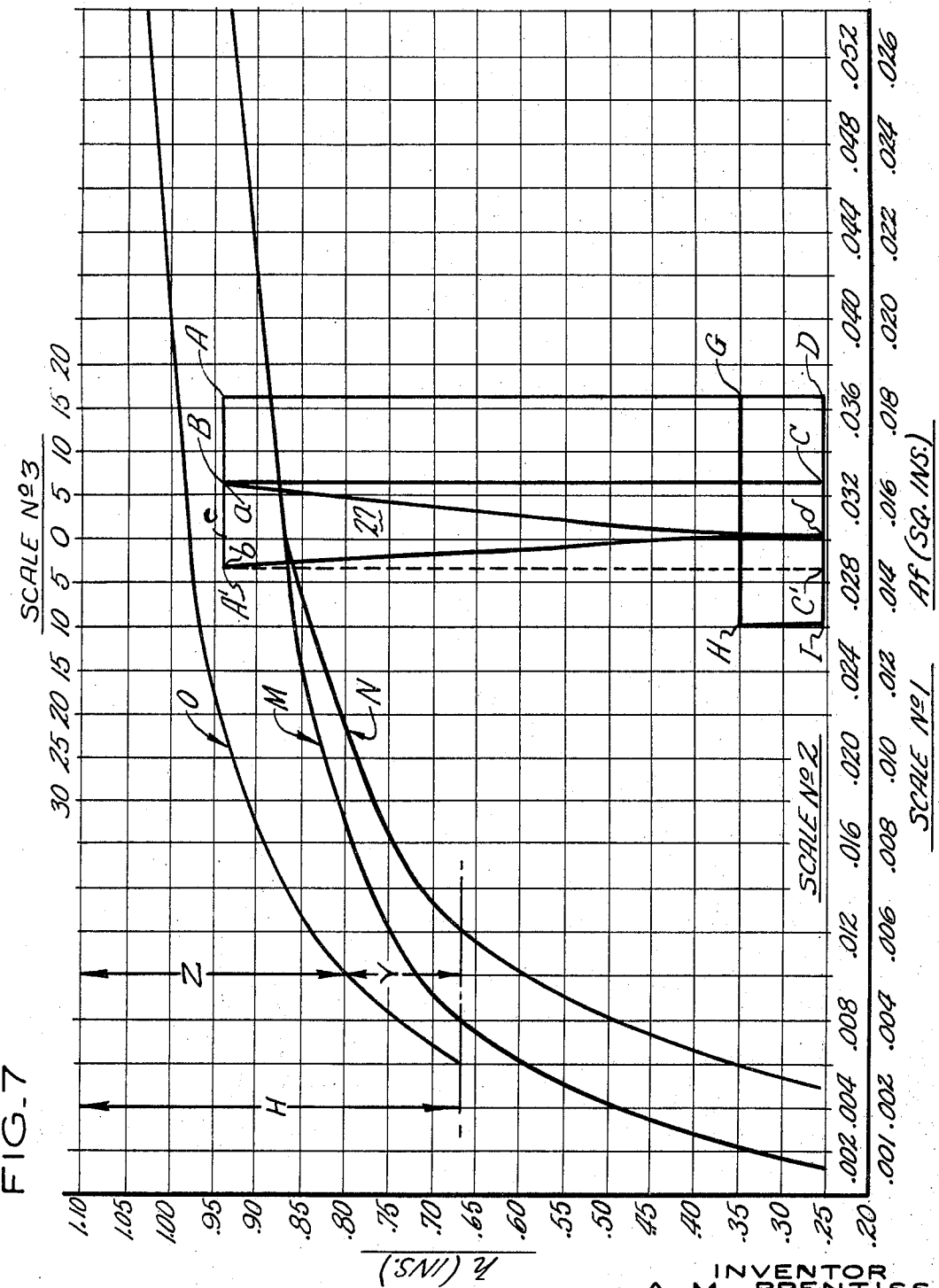

3,424,140
FUEL SYSTEM FOR INTERNAL
COMBUSTION ENGINES
Augustin M. Prentiss, Hartford, Conn., assignor to
Chandler Evans Inc., West Hartford, Conn., a corporation of Delaware
Filed Jan. 18, 1965, Ser. No. 426,282
U.S. Cl. 123—119                                19 Claims
Int. Cl. F02m 7/24, 17/10, 39/00

ABSTRACT OF THE DISCLOSURE

A fuel injection apparatus having fuel supplied under pressure to a positioning valve that divides the pressurized fuel supply into two streams. A fuel regulator positioned in the pressure field of the positioning valve with a fixed orifice and a valve having a variable area orifice. The area of the variable area orifice is controlled by an integrating linkage interconnected to said valve, a pressure-responsive bellows assembly, and said positioning valve, to automatically vary the proportion of fuel injected into the engine cylinder, in response to simultaneous variations in engine volumetric efficiency, density of the air in the engine intake manifold, and preselected air/fuel mixture ratios.

---

This invention pertains to fuel injection systems for internal combustion engines of the Otto cycle type, used for propelling automotive vehicles, and more particularly has reference to such systems wherein the fuel is injected into the engine air intake manifold, or cylinder ports, under a super-atmospheric, fuel pump pressure, at a regulated rate which bears a selected ratio to the rate of mass air flow to the engine. While the embodiment of my invention disclosed hereinbelow is directed to a multicylinder piston engine, its basic philosophy and principles of operaton also apply to internal combustion turbines, particularly those having rotary air compressors of the positive displacement type.

The principal features of my novel fuel supply system, which distinguish it from the prior art, are:

(1) The fuel flow is injected solely by the fuel pump which lifts the fuel from the fuel supply tank to the engine.

(2) Said flow is automatically regulated in proportion to:

(a) Variations in volumetric efficiency of the engine and changes in engine speed;

(b) Variations in density of the air in the engine intake manifold; and (c) Preselected changes in desired fuel/air mixture ratios, as affected by the degree of opening of a manually operated throttle valve in the engine air intake passage.

(3) The metered fuel flow is automatically divided by a fuel distributor into a number of equal portions corresponding to the number of cylinders of the engine to which my improved fuel supply system is applied; and each portion is delivered through a separate pipe from the distributor to the air intake port of each cylinder during the suction stroke of its piston.

Internal combustion engines of the Otto cycle type draw air into their combustion cylinders by the pumping action of their pistons on their intake strokes. Therefore, the volumetric flow of air passing through the engine is equal to the product of the piston displacement in each cylinder, times the number of cylinders, times half the number of revolutions per minute, times the volumetric efficiency of the engine as an air pump. Volumetric efficiency of the engine depends upon the efficiency of the intake and exhaust valves, and the back pressure of the exhaust manifold, which are also direct functions of engine speed (r.p.m.). This being the case, it follows that for any particular engine, where the piston displacement, number of cylinders, and volumetric efficiency are known quantities, the volumetric flow of air passing through the engine is a direct, though not constant, function of engine speed (r.p.m.), since volumetric efficiency varies with engine speed in a cubic equation relationship.

For optimum power and efficiency of a piston type internal combustion engine, the fuel supply should bear a predetermined ratio by weight to the air supply; this ratio being substantially constant throughout most of the normal operating speed range of the engine, but is somewhat higher at idling speed, and in the upper part of the speed range when maximum power is desired. The requirement of a predetermined ratio of the fuel to air supply by weight necessitates a regulation of the rate of fuel flow in accordance with the rate of mass air flow, which is equal to the volumetric flow through the engine cylinders, multiplied by the density of the entering air. The density of air entering the cylinders is that of the air in the intake manifold, which is a direct function of the absolute temperature and pressure of the air therein.

From the foregoing, it is apparent that the rate of fuel flow to an internal combustion engine should always be a direct function of the product of engine speed, volumetric efficiency, and air density in the intake manifold. Hence, a proper regulation of the rate of fuel flow to the engine, in accordance with these factors, results in the attainment of a desired fuel/air ratio under all engine operating conditions.

The regulation of the rate of fuel flow in accordance with the rate of air flow to an internal combustion piston engine has heretofore generally been accomplished by means of a carburetor which, in the most successful types, comprises means for regulating the velocity of fuel flow through a fixed metering orifice in accordance with the velocity of air flow through a venturi restriction in the air passage leading to the engine intake manifold. But, since the mass air flow varies not only with its velocity but also with its density, it is at once apparent that a correct fuel/air ratio cannot be obtained under varying engine (r.p.m.) speeds, temperatures and other variable operating conditions, unless means are also provided for regulating the rate of fuel supply in proportion to the density of the air supply, and also in proportion to the variation of volumetric efficiency with engine speed. While special air density compensating devices have generally been incorporated in aircraft engine carburetors with more or less satisfactory results, such devices are complicated, and have not heretofore been employed in motor vehicle carburetors. Also compensation for air density alone does not compensate for variations in volumetric efficiency with engine speed, therefore motor vehicle carburetors heretofore in use could not obtain an accurate fuel/air ratio under varying engine operating conditions.

One of the primary objects of my invention is to provide a simplified fuel injection system for automotive piston engines in which the rate of fuel flow to the engine is regulated simultaneously in proportion to the speed of the engine, modified for volumetric efficiency, and in proportion to the density of the air in the engine intake manifold, but the fuel flow is not motivated by the air flow, or the suction effect of the sub-atmospheric pressure, in the air intake manifold.

Another object is to provide a fuel supply system for piston engines in which the fuel is injected into the engine air intake manifold, or engine cylinder ports, by a rotary, constant displacement fuel pump whose displacement, per revolution of the engine, is proportional to half the total piston displacement per revolution of the engine, and whose fuel delivery to the engine is automatically regulated in proportion to the volumetric efficiency of the engine, and to the density of the air entering the engine cylinders; by means of a single, positionable, fuel metering valve whose flow area is automatically varied in one dimension, in proportion to the volumetric rate of air flow to the engine, and in another dimension in proportion to the density of the air in the engine intake manifold. Also, said metering valve is manually varied in said other dimension, in proportion to changes in preselected fuel/air mixture ratios, resulting from changes in the degree of opening of a throttle valve in the engine air intake passage.

Another object is to provide a simple device for regulating the fuel supply to the engine by dividing the fuel pump output into two portions, of which one is injected into the engine air intake system, and the other is by-passed around the fuel pump and returned to the fuel supply tank; the first portion being metered by a variable area metering orifice, and the second by a fixed area orifice; and both of said orifices being subject to the same pressure drop thereacross.

Another object is to provide a simple and accurate system of supplying fuel to a piston engine, in proper proportions by weight to the combustion air flow thereto, and which does not employ any additional devices such as: (1) to supply extra fuel to facilitate starting the engine; (2) for accelerating the engine; (3) for idling operation of the engine; or (4) for economizing fuel in the intermediate range of engine operation.

A further object is to provide a fuel supply system in which the fuel is raised from a fuel supply tank by the same pump that supplies the fuel injection pressure, thus eliminating the lift pumps now employed in motor vehicles.

With these and other objects which may be incident to my improvements, the invention consists of the combination and arrangement of elements hereinafter described and illustrated in the accompanying drawings, in which:

FIGURE 1 is a graph showing the rate of engine fuel flow, in relation to the rate of mass air flow, throughout the operating range of the engine. In this graph, the abscissas denote rates of mass air flow to the engine, and the ordinates denote values of the mixture ratio, expressed as percentage of fuel to the mass air flow at varying rates;

FIGURE 2 is a graph showing the rates of air and fuel flows, in relation to engine speed (r.p.m.), wherein the abscissas are the engine speed expressed as a percentage of maximum engine speed, and the ordinates, as Scale I (in the left-hand margin), show fuel flows to the engine, in pounds per minute; Scale II (left margin), shows the air flow ($W_a$) to the engine, in pounds per minute; the ordinates of Scale III (right-hand margin) show values of volumetric air flow, in cubic feet per minute; and the ordinates in Scale IV (right-hand margin) show values of the volumetric efficiency of the engine, expressed as percentage of maximum=1.00;

FIGURE 3 is a (somewhat diagrammatic) elevational view of my fuel injection system applied to an engine air intake manifold of the down-draft type;

FIGURE 4 is a partial vertical section taken along the line 4—4 of FIGURE 3;

FIGURE 5 is a partial horizontal section taken along the line of 5—5 of FIGURE 3;

FIGURE 6 is a central, vertical section of the fuel regulating unit of my invention, indicated by the reference symbol C in FIGURE 3;

FIGURE 7 is a graph showing the relation between the lift of the main fuel metering valve (ordinates in inches), and the values of the flow area through said valve (abscissas in square inches). The central part of FIGURE 7 also shows the configuration of the metering port through said metering valve, in relation to its lift.

It will be helpful to a clear understanding of the basic philosophy and principles of operation of my invention to state briefly the fuel/air mixture requirements of an Otto cycle engine and the characteristics of the air flow to the engine and the fuel flow necessary to meet the optimum mixture requirements; accordingly, these entities are shown in FIGURES 1 and 2 of the drawings.

Referring first to FIGURE 1 of the drawings, which shows the mixture requirements stated in the form of the ratio of fuel flow to the engine $W_f$ and the corresponding air flow to the engine $W_a$ which results in a fuel/air ratio $C = W_f/W_a$.

In FIGURE 1, in which the ordinates show the required values of the mixture ratio C, and the abscissas show rates of air flow $W_a$, it will be noted that curves A and B show the mixture ratio C required, for optimum performance of the engine at part throttle (10% open) operation, for manifold air temperatures of 440° F. and for 710° F., respectively; and curves C and D show the mixture ratio C for optimum performance of the engine at full throttle opening (100%) at 440° F. and 710° F. manifold air temperature, respectively.

An inspection of curves A, B, C, and D make it clearly apparent that for part throttle (10%) operation, the mixture ratio C varies from approximately .080 at 1 percent of maximum air flow, to .0625 at approximately 40 percent of maximum air flow; and beyond an air flow of 40 percent, the mixture ratio C remains constant at a value of .0625. For full (100%) throttle operation, the mixture ratio C varies from approximately .080 at 1 percent of maximum air flow, to 0.78 at approximately 27 percent of maximum air flow; and thereafter remains at .078 throughout the remainder of the operating range of the engine, out to 100 percent maximum air flow.

The reasons for the difference in the characteristics of curves A and B for part throttle operation, and C and D for full throttle operation, are first that for the former full engine power is not required and economy of fuel is the governing consideration; whereas for the latter operation, maximum power is required and becomes the governing parameter. It has been established empirically by extensive engine tests that as the throttle is opened progressively from 10 percent to full throttle opening, the value of the mixture ratio C progressively rises from its minimum value of .0625 to .078, so that the characteristic fuel flow curves for intermediate throttle openings is a family of curves similar to curves A and B, but becoming progressively shallower as the throttle varies from 10 percent to 100 percent opening.

Finally, it will be noted that curves B and D, corresponding to a manifold air temperature of 710° F., are steeper in slope than corresponding curves A and C. This difference is due primarily to the fact that at the higher temperature (710° F.) the density of the air flowing to the engine is lower than at 440° F.

Referring next to FIGURE 2, which shows the characteristics of the air and fuel flows to the engine at varying engine speeds (r.p.m.) from zero to 100 percent (highest rated) speed, the unbroken line curves H, I, J, and K indicate fuel flow $W_f$ and the broken (dash) line curves C, D, E, and F show the corresponding air flows $W_a$. Line A shows the total engine piston displacement (cu. ft./min.) throughout the operating speed range, from zero to maximum rated speed; and curve B shows the corresponding values of the volumetric air flow (cu. ft./min.). The difference in ordinates between curves A and B reflect the effect of the volumetric efficiency $n_v$ of the engine, as its speed is increased from zero to 100 percent. Curve M shows the variation in volumetric efficiency $n_v$ as the engine speed is varied from zero to 100 percent. Because of this variation in volumetric efficiency, which is not taken into account in fuel regulators which operate on the speed-density principle, such regulators fail to maintain a desired parity between the rates of fuel and air flows to the engine with varying speeds; and since curve M shows that the volumetric efficiency $n_v$ varies from 70 percent at maximum speed to 90 percent at minimum speed, it is obvious that speed density fuel regulators are subject to an error which amounts to over 20 percent at the minimum speed.

Referring to FIGURE 2, it will be noted that while all of the curves for fuel and air flows at different engine speeds coincide at zero speed, they progressively diverge from each other as engine speed increases and reach maximum divergence at the maximum engine speed. This divergence is measured by the values of the ordinates between the full line curves for fuel flow and the broken line (dash) curves for corresponding air flow. Because of this divergence, the fuel flow varies from somewhat over 90 percent of the fuel pump output near zero speed, to a maximum of about 25 percent (curve K) at maximum speed. These ordinates also show the relation of fuel flow to corresponding air flow, at varying engine speeds; and the values of the ordinates, between the fuel flow curves, indicate the magnitude of the fuel flows as required by the engine. The difference between the ordinates of the fuel curves and the ordinates of straight line G (total fuel pump output) measure the portion of the pump output which is not required for engine operation, which in my invention is by-passed around the fuel pump and returned to the fuel supply tank. Accordingly, the fuel supply system of my invention achieves the desired objective of attaining the desired fuel/air ratio under all engine operating conditions.

Broadly comprehended (as shown in FIGURES 3, 4 and 5), the fuel injection system of my invention comprises the following principal units:

a fuel supply tank A;
a rotary fuel pump B;
a fuel flow regulator C; and
a fuel distributor D.

Tank A has a filling throat 1, which is closed by a detachable cap 2, that hermetically seals the tank from the outside atmosphere during operation of the engine. Tank A is connected by a conduit 3 to the air intake manifold 4 of an internal combustion piston engine (not shown), whereby the pressure in tank A is the same as the pressure in manifold 4 at all times during engine operation.

Fuel pump B is of the rotary constant displacement type, such as a gear or vane pump, and is geared to the engine so that it rotates in fixed speed relation therewith, and draws fuel from tank A through a pipe 5 and delivers said fuel to fuel regulator C through pipe 6. Fuel regulator C divides the pump output fuel flow into two portions: the first being that needed to meet the engine operating requirements, and the second being that not required by the engine, which latter is by-passed around pump B and returned to tank A through a pipe 7. The portion of the fuel pump output required by the engine is fed into distributor D by a connecting pipe 8, and from distributor D, it flows to each of the engine cylinder air intake ports 9 (FIGURE 4) through one of a plurality of connecting pipes 10, each of which is held in the center of its port 9 by a spider.

Combustion air enters manifold 4 through air intake passage 11 which is provided with a butterfly throttle valve 12 that is varied from open to closed position, and vice versa, by an operating lever 13, fixedly attached to a spindle 14 journaled in the wall of air intake conduit 11, all as clearly shown in FIGURES 3 and 4.

As shown in FIGURE 6, the fuel regulator C comprises a casing 15 that is attached to the outer wall 16 of manifold 4 by a plurality of flanges 17 and 18. In the upper portion of casing 15 is slideably mounted a positioning valve 19 which reciprocates in sleeved disc 20, which is screw-threaded into the wall of casing 15, and is provided with a plurality of ports 21 through which the fuel entering casing 15 from pipe 6 flows downwardly. Also screw-threadedly attached to the inside of said wall, in the upper part of casing 15, is an adjustable plate 22 having central port 23 which cooperates with the valve 19 to vary the flow area through port 23. Valve 19 is biased in an upward direction by a spring 24, so as to close port 23 when in its uppermost position. Valve 19 is subject to the downward force of the fuel stream passing through port 23, and its position, with respect to port 23, at any instant is determined by the balance between the downward force of the impinging fuel stream, and the upward force of spring 24. Since disc 20 and plate 22 are adjustable in position by virtue of their screw-threaded relation to casing 15, the position of valve 19, with respect to port 23, can be precisely adjusted, so as to insure that valve 19 has an exactly determined position for each rate of fuel flow through port 23.

Fuel, under pump discharge pressure $P_d$, entering port 23 flows into the space in casing 15 below said port where its pressure falls to pressure $P_x$, which pressure exists in all parts of casing 15 above main metering valve 25, and below port 23. The portion of the fuel flowing through port 23 that is not needed by the engine operating requirements at any instant of time $W_r$ is discharged from casing 15 through a fixed area restriction 26 in return pipe 7. Restriction 26 has a constant flow area $A_r$ through which the by-passed fuel $W_r$ returns to tank A under a pressure differential $P_x - P_m$. The portion of the fuel required by the engine flows from the lower part of casing 15 through a metering port 27 in valve 25, and is discharged from casing 15 through pipe 8 to the engine air intake ports 9 where it enters the cylinders of the engine (not shown).

Main metering valve 25 is of cylindrical shape, and is slideably mounted in a sleeve 28, and its metering port 27 is in the form of a recessed slot which extends from near the top of valve 25 to near its bottom, as clearly shown in FIGURE 6. Sleeve 28 is rotatably mounted in the lower part of casing 15 and is closed at its bottom by a transverse wall 29, so as to form a chamber 30 between the lower end of valve 25 and wall 29. Sleeve 28 is rotated through a small angle sufficient to open and close the flow area through port 27 by a lever 31 which is adjustably fixed to a spindle 32 which is integrally attached to wall 29, so that lever 31 rotates sleeve 28 through an angle determined by the angle through which lever 31 is moved. Lever 31 is attached by a linkage (not shown) to throttle lever 13 so as to move in definite fixed relation with the movement of said lever 13, whereby sleeve 28 is rotated to vary the flow area through valve 27, as throttle 12 is moved to vary the flow area through air intake passage 11. Valve 25 is also provided with a fuel passageway 33, whereby fuel in casing 15 above valve 25 flows down into chamber 30 at the same pressure, so that valve 25 is balanced, and not affected by the pressure $P_x$, in casing 15.

Adjustably attached to the top of valve 25 is a rod 34 which carries near its upper end a pin 35 that engages in a slot 36 in a lever 37 which is mounted on a fixed pivot at 38 in casing 15, whereby valve 25 is adjusted in vertical position by the movement of lever 37 about its pivot 38. Lever 37 is provided near its outer end with a second slot 39 which engages a pin 40 that is in turn mounted in a slot 41 in a horizontal flange 42, fixedly attached to the lower end of valve 19, whereby the angular position of lever 37 is varied by the vertical movement of slot 41 in flange 42 attached to valve 19.

Pin 40 also engages in a vertical slot 43 in a flange 44 at the left end of a rod 45, which is slideably mounted in a flange 46 (integral with casing 15) and the right-hand wall of casing 15, through which rod 45 projects and extends through wall 16 or air intake manifold 4, and is attached by screw threads to a plate 47 that closes the left end of a Sylphon bellows 48, whose right end is hermetically closed by a stationary plate 49, fixedly attached to a bonnet 50. Bonnet 50 is fixedly mounted on the inside of wall 16 of an intake manifold 4, by a plurality of screws 51 and is provided with a plurality of ports 52 through which the air in intake manifold 4 enters and contacts the flexible wall 53 and moveable plate 47 of bellows 48.

The interior of bellows 48 is filled with a predetermined weight of air at standard temperature 519° F. (ab.) and pressure 14.7 p.s.i. (ab.); and since said bellows is subject to the temperature $T_m$ and the pressure $P_m$ of the air in air intake manifold 4, the temperature and pressure in bellows 48 is at all times the same as the temperature $T_m$ and pressure $P_m$ of the air in air intake manifold 4. Since the volume of air in bellows 48 varies directly with its temperature and inversely as its pressure, said volume V will vary inversely as the density of air in air intake manifold 4. As the bellows 48 contracts or expands, it moves its movable plate 47, to the right and left, and thus shifts the position of rod 45 and its vertical slot 43, in accordance with the density of the air in air intake manifold 4. Since lever 37 is connected through pin 40 with the horizontal slot 41 on valve 19 and also with the vertical slot 43 on rod 45, said lever is moved in accordance with the ratio of vertical movement y of valve 19 to the horizontal movement x of rod 45. As lever 37 is so moved, it transmits a corresponding vertical movement h to valve 25 through pin 35.

The pivot 38 is located at a selected fixed horizontal distance a from the center line of valve 25 which extends through pin 35, where the vertical distance h through which valve 25 is moved bears the same relation to the fixed distance a as the vertical movement y of valve 19 bears to the horizontal movement x of rod 45; that is to say, $h/a=y/x$, so that if a is given a value of 1.00, then h is equal to $y/x$ or y is equal to hx. Leakage of fuel from casing 15 along the rod 45 is prevented by an O-ring 54 which is mounted in the right wall of casing 15 and encircles rod 45, as clearly shown in FIGURE 6.

The fuel metered by valve 25 flows through by a pipe 8 into distributor D which comprises a cylindrical chamber 50 whose bottom wall is provided with a number of inlet ports 51, each of which coincides with the upper end of a pipe 10 leading to an air intake port 9 of each cylinder. Rotatably mounted in the lower part of chamber 50, in contact with its bottom wall, is a disc 52 which is fixed to the upper end of a spindle 53 that is connected to the engine, whereby disc 52 rotates in fixed speed relation with the engine. Disc 52 is provided with a cutout portion 54 (see FIGURE 5) whose base width on the periphery of disc 52 coincides with the diameter of each port 51. As disc 52 is rotated in synchronization with the engine, it successively uncovers each of ports 51, whereby fuel flows through said port and its corresponding pipe 10 to the air inlet 9 to the cylinder to which pipe 10 leads. As all of the outlet ports 51, except the one coinciding with cutout portion 54, are covered by disc 52 so as to preclude the flow of fuel therethrough, the only flow through distributor D at any instant of time is through a pipe 10, whose port 51 is uncovered by cutout portion 54. Fuel is delivered to each cylinder during the intake stroke of its piston; the pipes 10 and cutout portion 54 being so arranged that each port 51 is uncovered by cutout portion 54 in accordance with the firing sequence of the cylinders.

For multi-cylinder, high speed engines, where the flow of combustion air and fuel to the engine is substantially continuous during engine operation, distributor D may be omitted and replaced by a cylindrical chamber (of the same shape and dimensions as chamber 50) from which the flow will take place (through each of pipes 10) in accordance with the suction stroke of the piston in each cylinder, which creates momentarily a somewhat lower pressure $P_m$ existing generally in the intake manifold 4. Here it is of particular importance that the design of the intake manifold be such that the air intake passage to each cylinder is in proportion to its air-pumping capacity so that the velocity of air flow will be substantially the same in all ports of the air intake manifold, under all conditions of engine operation.

Referring next to FIGURE 7 whose (lower) horizontal Scale 1 shows the values (in square inches) of the flow area $A_f$ through metering valve 25, and whose vertical scale shows the values (in inches) of the rise y of positioning valve 19, and the corresponding rise h of the metering valve 25, which latter is also the value of the vertical dimension of the flow area $A_f$ through orifice 27. The curve M shows the value of the flow area $A_f$ of the orifice 27 for each corresponding value of the rise h of valve 25. Curve N refers to horizontal Scale 2 and shows the values of the width b of orifice 27 for corresponding values of h, so that the flow $A_f$ through orifice 27 equals $bh/2$.

Curve O shows the values of the rise (in inches) y of positioning valve 19 under diminishing fuel flow through orifice 23. Curve O also shows the values (in inches) of the compression z of spring 24, with the rise of valve 19. Since the distance between the base support of spring 19 (FIGURE 6) on disc 20, and the position of disc 22 and orifice 23 is fixed, this distance may be denoted by the constant-valued symbol H, which also shows the position of the valve 19 under its maximum rise when it just completely closes orifice 23. From the geometry of the elements just mentioned, it is apparent that the compression z of spring 24 is equal to fixed distance H minus the rise y of valve 19. The relation $H=y+z$ is clearly shown by curve O in FIGURE 7.

In the center part of FIGURE 7 there is shown, in front elevation, metering orifice 27 in valve 25 (of FIGURE 6) on the same vertical scale, as shown in the left-hand scale of FIGURE 7. The horizontal Scale 3 for orifice 27 is shown at the top of FIGURE 7 and is of the same magnitude as the vertical scale at the left of FIGURE 7, so that the proportions between height h of orifice 27 and its width b are in true proportion to each other. But since the scale used in FIGURE 7 for the orifice 27 is much larger than the scale in FIGURE 6, the apparent size of orifice 27, as it appears in FIGURE 7, is greatly magnified over its actual size.

It will be noted that the shape of orifice 27, as shown in FIGURE 7, is generally triangular, with the base of the triangle equal the maximum width b of the orifice, and its altitude equal to h. Orifice 27 consists of two parts, namely: that to the right of the vertical line e, d, which is the trangular area defined by the points a, e, d; and the other part of orifice 27 is the trangular area to the left of line e, d, as defined by points e, b, d. The first area a, e, d, is the area of the orifice 27 when the engine is operating at partly open (10%) throttle, and the area to the left of the line e, d, as defined by the points e, b, d, is the additional flow area through valve 27, as the throttle 12 is advanced from partly (10%) open position to full (100%) position. It will be noted that the boundary lines, a, d, and b, d, are curved so that the flow area $A_f$ defined thereby is a contoured shape, as determined by the values of the width b of the orifice 27 at each corresponding value of h. The relationship between the values of b and h will be explained in further detail hereinbelow in connection with the operation of valve 25.

The rectangular area A, B, C, and D, is that of an orifice in the rotatable sleeve 28 when, as shown in FIGURE 7, it is in a position to completely cut off all flow through orifice 27 (see FIGURE 6). As sleeve 28 is rotated in a counterclockwise direction (when viewed from the top of valve 25), the edge defined by the vertical line B, C, moves to the left, unmasking successive portions of the triangular area a, b, d, of the orifice 27 and permits fuel flow through the area thus uncovered. From the position of line B, C, as shown in FIGURE 7, which corresponds to zero engine speed, as the sleeve 28 is rotated, line B, C, moves to the left until it coincides with line e, d, when the throttle is open 10%. As the throttle 12 (FIGURE 3) is further opened, the line defining the edge B, C, of the orifice A, B, C, D, moves to the left of line e, d, until it finally coincides with the line A, C, at which point the throttle is wide (100%) open, and the orifice $A_f$, as defined by the triangular area $a$, $b$, $d$, which is at its maximum value.

In addition to variation of the orifice area $A_f$ by manual movement of the sleeve 28, as just described, the flow area $A_f$ through valve 25, as defined by the triangular $a$, $b$, $d$, of said orifice is also varied by the rise of valve 25 with decreasing fuel flow through orifice 23 (see FIGURE 6). During such rise of valve 25, the value of the vertical dimension $h$ of orifice 27 gradually increases from its minimum value of approximately 25%, for minimum fuel flow $W_f$ through orifice 27, to a value of approximately 93% for maximum flow therethrough, as shown by curve N in FIGURE 7. As the rise of valve 25 increases, the vertical dimension $h$ of the orifice 27 correspondingly increases, and as $h$ increases, the width $b$ of the orifice 27 progressively decreases, as shown by the contoured lines $a$, $d$, and $b$, $d$, of FIGURE 7. Accordingly, when both $h$ and $b$ decrease, with decreasing values on the rise of valve 25, the flow area $A_f$ through orifice 27 decreases, as shown by the generally triangular area of the orifice 27, indicated by points, $a$, $b$, $d$, in FIGURE 7.

In order that the fuel flow entering orifice 27 may flow freely out through supply conduit 8, the outlet area of valve 25 is not restricted, during the rotation of sleeve 28, from its closed to wide open position of orifice 27, said sleeve is provided with an elongated horizontal orifice, as indicated by the rectangular area G, H, I and D.

The mathematical relationship between corresponding values of $y$ and $z$ and $h$ and $b$ under varying engine operating conditions, is explained in greater detail hereinbelow in the description of the operation of fuel regulator C.

OPERATION

The principles of operation of my improved fuel supply system can best be described in terms of certain mathematical relations between its component elements, and accordingly, the following symbols are used to denote the indicated entities:

$W_a$=rate of mass (weight) air flow to engine;
$W_f$=rate of (weight) fuel flow to engine;
C=fuel/air mixture ratio $W_f/W_a$;
$P_a$=atmospheric presure, absolute (p.s.i.a.);
$P_m$=air intake manifold pressure (p.s.i.a.);
$\gamma_a$=atmospheric density (.07651 pound per cubic ft. at 14.70 p.s.i. and 519° F. abs.);
$\gamma_m$=manifold air density (lb./cu. ft.), at $P_m$ and $T_m$;
N=engine speed, revolutions per minute (r.p.m.); e.g., maximum N=3800;
D=total displacement of engine pistons (cu. ins.); e.g., 331 cu. ins., per engine revolution;
s=air suction cycle of engine (=2 for 4 cycle engine);
$T_a$=temperature (absolute) of ambient atmosphere in ° F.;
$T_m$=tempearture (absolute) of air in engine air intake manifold;
$n_v$=volumetric efficiency of engine as an air pump; e.g., 70% to 90%;
d=displacement of fuel pump, in lbs. per engine revolution;
Q=the rate of volumetric air flow through the engine (cu. ft./min.);
$W_p$=pump output; e.g., 2.40 lbs./min. (maximum), at 100% N;
$W_r$=by-passed fuel flow, lbs./min.;
$P_m$=fuel pressure of metered fuel=air pressure ($P_m$) in manifold 4;
$C_a$=coefficient of air flow;
$C_f$=coefficient of fuel flow;
$A_f$=flow area of fuel metering valve orifice 27 (sq. ins.);
$A_r$=flow area of by-pass orifice 26 (sq. ins.);
$A_p$=flow area through positioning valve in orifice 23;
$A_v$=area of positioning valve, subject to fuel pressure differential $P_a-P_x$;
$A_r$=flow area (in sq. ins.) through restriction 26 in return pipe 7.

A four cylinder, internal combustion engine, such as is used to propel automotive vehicles, may be regarded as an air pump, in which the air pumping capacity is one-half the total piston displacement volume of all its cylinders, i.e., $D/2$, times the running speed N, revolutions per minute; hence the total piston displacement is $N(D/2)$. If the volumetric efficiency of the engine is $n_v$, then its air pumping capacity is $(D/2)Nn_v$, and the volume of air flowing through the engine Q is $Nn_v(D/2)$. If the density of this flowing air is $\gamma_m$, in pounds per cubic foot, then the rate of mass air flow (by weight)

$$W_a = Q\gamma_m = Nn_v(D/2)\gamma_m$$

If the total volume of the cylinders D is expressed in cubic feet, and N is r.p.m. and $\gamma_m$ is in lbs./cu. ft., then $W_a$ is pounds per minute.

The density $\gamma_m$ of the air flowing through the engine intake manifold 4 is determined by its pressure $P_m$ and its temperature $T_m$ which in turn vary with the velocity $u$ of the flowing air, which depends upon engine speed N and the flow area $A_f$ of the air passage, i.e., for the degree (percent) of throttle opening, which generally varies from a minimum of 5% at idling speed to a maximum of 100% at top rate of speed, and power output. The lowest practical operating speed is generally about 10% of maximum speed.

The density $\gamma_m$ of the air passing through the air intake manifold is determined by measuring its temperature $T_m$ and its pressure $P_m$, under all operating conditions, and the values of $\gamma_m$ are determined by the equation $$\gamma_m = \gamma_a(T_a/T_m) \times (P_m/P_a)$$

where $\gamma_a$ is the density of the atmospheric air entering the engine, =to .07651 lb. per cu. ft. at 14.76 p.s.i.a. barometric pressure $P_a$, and 519° F. barometric temperature $T_a$.

The volumetric efficiency $n_v$ of the engine, as an air pump, varies with engine speed, in a cubic equation depending upon the relationship therewith, as shown by curve M in FIGURE 2. The values of $n_v$ at any speed is determined for each engine design by measuring the volumetric air flow Q at various engine speeds N for minimum to maximum. Volumetric efficiency $n_v$ generally varies from a value of about .70 at maximum speed to about .90 at minimum (5%) speed.

The values of the density $\gamma_m$ of the air flowing through the air intake manifold 4 is ascertained by measuring the absolute pressure $P_m$ and absolute temperature $T_m$ of said air, under all engine operation conditions, and the values of $\gamma_m$ are determined by the equation:

$$\gamma_m = \gamma_a(T_a/T_m \times P_m/P_a) \quad (1)$$

The mass (weight) rate of air flow $W_a$ is equal to $Q \times \gamma_m$; i.e., $$W_a = Q\gamma_m \quad (2)$$

Since Q is also equal to the piston displacement, per revolution $D/2$ times engine speed N, times the volumetric efficiency $n_v$ $$Q = (D/2)Nn_v \quad (3)$$

The required rate of fuel flow $W_f$ is determined by the rate of air flow $W_a$, multiplied by the selected fuel/air mixture ratio C, which varies with $W_a$ and the degree (percent) of air throttle valve 12 opening, from 10% of maximum opening to 100% of said maximum, as shown in curves A, B, C, and D, in FIGURE 1 of the drawings. Accordingly, $$W_f = CW_a \quad (4)$$

The rate of fuel flow $W_f$ is also equal to the total fuel pump output $W_p$ minus the portion of fuel $W_r$ by-passed around the pump and returned to the fuel tank.

$$W_f = W_p - W_r \quad (5)$$

The rate of fuel flow $W_f$ is further equal to the fuel pump displacement $d$, per revolution of the engine, times engine speed N, or $$W_f = dN \quad (6)$$

From the foregoing equations, the ratio of fuel flow to the engine $W_f$ to the total fuel pump output $W_p$ may be expressed as follows:

$$W_f W_p = C(D/2) N n_v \gamma_m / dN \quad (7)$$

If the constant ratio of $D/2$ to $d$ is expressed by the symbol K, then $$W_f/W_p = C K n_v \gamma_m \quad (8)$$

Equation 8 shows that the ratio $W_f/W_p$ is independent of engine speed N, and depends only on the selected fuel/air mixture ratio C, volumetric efficiency $n_v$ of the engine as an air pump, and the density $\gamma_m$ of the air flow through the engine air intake manifold.

In general $\gamma$ varies inversely as the volume V of a unit weight of air, i.e., $$\gamma = 1/V \quad (9)$$

and if the unit weight of air is confined to a cylinder of end area A and length L, the volume V is then equal to AL, and if area A is constant, and the length L is proportional to V, then $$\gamma = 1/LA \quad (10)$$

and since A is constant and may be made equal to 1.00, $$\gamma = 1/L \quad (11)$$

By substituting $1/L$ for $\gamma_m$ in Equation 8 above, we have:

$$W_f/W_p = C K n_v/L \quad (12)$$

Since (FIGURE 6) the distance which the valve 19 and slot 42 move is $y$ and the corresponding distance which the rod 45 and slot 43 move is $x$, ratio of $y/x$ can be made equal to the ratio $CKn_v/L$, or $$y/x = CKn_v/L \quad (13)$$

Since fuel flow to the engine $W_f$ and the fuel by-passed around the fuel pump and returned to the fuel tank $W_r$ are both subject to the same flow pressure differential $P_x - P_m$, it follows that $W_f$ and $W_r$ depend only on the flow areas $A_f$ through the metering valve 25, and the flow area (constant) $A_r$ of the restriction 26 in return conduit 7.

Accordingly, $$W_f/W_r = A_f/A_r \quad (14)$$

The pump output $W_p$ is the same as the flow $W_f$ plus $W_r$, and the pump output flow $W_p$ also flows through an area $A_p$, equal to $A_f$ plus $A_r$, so that:

$$W_f/W_p = A_f/A_p = A_f/(A_f + A_r) \quad (15)$$

Since the fuel flow $W_f$ required by the engine is determined for any engine speed from the Equation 4 above, the ratio $W_f/W_p$ can be determined for any engine speed and mixture ratio C.

Also since the metering port 27 and the fixed restriction 26 are subject to the same pressure differential $P_x - P_m$, $$A_f/A_p = W_f/W_p \quad (16)$$

combining Equations 15 and 16, we have:

$$A_f/A_p = A_f/(A_f + A_r) \quad (17)$$

and the value of $A_p$ for any selected value of $A_f$ is determined by Equation 17.

The flow area $A_f$ through metering valve 25 can be expressed in terms of the height $h$ and corresponding width $b$ of triangular orifice 27, i.e., $$A_f = hb/2 \quad (18)$$

where $h$ is the height and $b$ the corresponding width of orifice 27.

From the relation of similar triangles (in FIGURE 6) we have:

$$y/x = h/a \quad (19)$$

Since the distance $a$ of the fixed pivot 38 from the center line of valve 25 is constant, and can be given any assigned value, distance $a$ can be made equal to 1.00 inch, whereupon, $$y/x = h \text{ (in inches)} \quad (19a)$$

If the distance $a$ is made any other value, $h$ equals the corresponding constant multiple of $y/x$ equal to said value.

Referring to the positioning valve 19 (FIGURE 6), it will be noted that the valve moves downwardly a distance $z$ under a pressure differential $P_d - P_x$ acting on an area $A_v$ of this valve. If the constant rate of spring 24 is denoted by S, we can determine the value of $z$ for any rate of fuel flow $W_p$ through orifice 23 by the equation:

$$(P_d - P_x) A_v = Sz$$
$$A_v = Sz/(P_d - P_x) \quad (20)$$

The flow $W_p$ through orifice 23 can be expressed in terms of the flow area $A_p$ through said orifice 23, and the pressure differential $P_d - P_x$ thereacross, thus:

$$W_p = C_f A_p \sqrt{(P_d - P_x)}$$
$$A_p = W_p / C_f \sqrt{(P_d - P_x)} \quad (21)$$

And since the fuel flow area $A_0$ through orifice 23 equals $A_p + A_v$, or $$A_0 = A_v + A_p \quad (22)$$

from Equations 20 and 21 and 22 we have:

$$S_z/(P_d - P_x) + C_f W_p \sqrt{(P_d - P_x)} = A_0 \text{ (a constant)} \quad (23)$$

Since the entities S, $C_f$ and $A_0$ are constants and $W_p = Nd$, we can determine the values of $W_p$ at any speed N of the engine, and determine the value of $z$ from Equations 20, 21, 22, and 23.

The value of $y = (H - z)$ can then be computed by subtracting value of $z$ from the constant value of H, and from value of Y we can compute the value of $h$ for any engine speed. With the value of $h$ thus determined, we can find the corresponding values of $b$ from the equation:

$$A_f = bh/2 \quad (24)$$

With the values of the various factors affecting the design of my novel fuel regulator C, determined from Equations 1–24 above, we can compile a tabulation of these factors as applied to any particular engine. Thus, for an 8 cylinder engine, having a total cylinder displacement of 331 cu. ins. per revolution, and a maximum rated speed of 3880 r.p.m., the values of all the factors that determine the design of my fuel regulator C are shown in the following Tables I, II, III and IV.

Table I shows the values of $(C)(W_f)$ and required value of $h$ for the engine running at part (10%) open throttle, and at full (100%) open throttle with the temperature $T_m$ of the air in the engine intake manifold at 440°.

Table II shows the same data as Table I, but with the temperature $T_m$ at 710° F. A comparison of the data in Tables I and II shows the effect on the various factors set forth of a change in temperature $T_m$ of from 440° to 710° F.

Tables III and IV show the actual values of the factors set forth, as obtained by the operation of the fuel regulator of my invention.

TABLE I.—REQUIRED VALUES OF C, $W_f$ and $h$

[$T_m = 440°$]

10% throttle

| N, percent | Q | $\gamma_m$ | $W_a = Q\gamma_m$ | Percent max. $W_a$ | Req. C | Req. $W_f$ | Req. $h = y/x$ |
|---|---|---|---|---|---|---|---|
| 5 | 16.375 | .090241 | 1.4746 | 6.40 | .0756 | .11148 | .9290 |
| 10 | 32.76 | .08993 | 2.9277 | 12.78 | .0703 | .2058 | .8575 |
| 20 | 64.78 | .086850 | 5.6264 | 24.57 | .0651 | .3663 | .7632 |
| 30 | 96.08 | .082915 | 7.9648 | 34.76 | .0636 | .5066 | .7036 |
| 40 | 126.62 | .077830 | 9.8566 | 43.02 | .0630 | .6210 | .6469 |
| 50 | 156.50 | .071324 | 11.162 | 48.72 | .0625 | .7000 | .5833 |
| 60 | 183.43 | .065856 | 12.0783 | 52.77 | .0625 | .7553 | .5245 |
| 70 | 208.90 | .058963 | 12.3174 | 53.33 | .0625 | .7699 | .4583 |
| 80 | 229.95 | .053334 | 12.2689 | 53.12 | .0625 | .7668 | .3990 |
| 90 | 245.66 | .049057 | 12.0516 | 52.62 | .0625 | .7533 | .3488 |
| 100 | 254.75 | .046490 | 11.8238 | 52.61 | .0625 | .7404 | .3085 |

100% throttle

| N, percent | Q | $\gamma_m$ | $W_a = Q\gamma_m$ | Percent max. $W_a$ | Req. C | Req. $W_f$ | Req. $h = y/x$ |
|---|---|---|---|---|---|---|---|
| 5 | 16.375 | .090241 | 1.4779 | 6.45 | .0798 | .1179 | .9825 |
| 10 | 32.76 | .090235 | 2.9555 | 12.90 | .0791 | .2338 | .9742 |
| 20 | 64.78 | .090227 | 5.8452 | 25.51 | .0780 | .4559 | .9498 |
| 30 | 96.08 | .090203 | 8.6669 | 37.83 | .0780 | .6760 | .9389 |
| 40 | 126.62 | .090172 | 11.4196 | 49.84 | .0780 | .8908 | .9277 |
| 50 | 156.50 | .090134 | 14.1057 | 61.14 | .0780 | 1.1002 | .9169 |
| 60 | 183.43 | .090086 | 16.5236 | 72.16 | .0780 | 1.2893 | .8954 |
| 70 | 208.90 | .090041 | 18.8100 | 82.10 | .0780 | 1.4672 | .8733 |
| 80 | 229.95 | .089995 | 20.7001 | 90.36 | .0780 | 1.6146 | .8409 |
| 90 | 245.66 | .089958 | 22.0994 | 96.46 | .0780 | 1.7230 | .7977 |
| 100 | 254.75 | .089931 | 22.9109 | 100.00 | .0780 | 1.7871 | .7446 |

TABLE II.—REQUIRED VALUES OF C, $W_f$ AND $h$

[$T_m = 710°$]

10% throttle

| N, percent | Q | $\gamma_m$ | $W_a = Q\gamma_m$ | Percent max. $W_a$ | Req. C | Req. $W_f$ | Req. $h = y/x$ |
|---|---|---|---|---|---|---|---|
| 5 | 16.375 | .055925 | .9145 | 6.43 | .0756 | .06914 | .5762 |
| 10 | 32.76 | .055806 | 1.8209 | 12.88 | .0703 | .1272 | .5317 |
| 20 | 64.78 | .054629 | 3.5390 | 24.89 | .0651 | .2304 | .4800 |
| 30 | 96.08 | .053101 | 5.1020 | 35.89 | .0636 | .3244 | .4506 |
| 40 | 126.62 | .051589 | 6.4338 | 45.96 | .0630 | .4112 | .4284 |
| 50 | 156.50 | .048640 | 7.6120 | 53.54 | .0627 | .4773 | .3978 |
| 60 | 183.43 | .046224 | 8.4788 | 59.64 | .0625 | .5300 | .3681 |
| 70 | 208.90 | .043332 | 9.0520 | 63.74 | .0625 | .5658 | .3362 |
| 80 | 229.95 | .040905 | 9.4082 | 66.78 | .0625 | .5880 | .3063 |
| 90 | 245.66 | .039019 | 9.5842 | 67.42 | .0625 | .5993 | .2775 |
| 100 | 254.75 | .038025 | 9.6874 | 68.13 | .0625 | .6055 | .2523 |

100% throttle

| N, percent | Q | $\gamma_m$ | $W_a = Q\gamma_m$ | Percent max. $W_a$ | Req. C | Req. $W_f$ | Req. $h = y/x$ |
|---|---|---|---|---|---|---|---|
| 5 | 16.375 | .055925 | .9159 | 6.44 | .0798 | .0798 | .6091 |
| 10 | 32.76 | .055922 | 1.8228 | 12.82 | .0791 | .1442 | .6083 |
| 20 | 64.78 | .055916 | 3.622 | 25.48 | .0784 | .2854 | .5976 |
| 30 | 96.08 | .055910 | 5.3718 | 37.78 | .0781 | .4195 | .5826 |
| 40 | 126.62 | .055898 | 7.0795 | 49.80 | .0780 | .5522 | .5752 |
| 50 | 156.50 | .055886 | 8.7462 | 61.52 | .0780 | .6822 | .5685 |
| 60 | 183.43 | .055872 | 10.2486 | 72.09 | .0780 | .7996 | .5545 |
| 70 | 208.90 | .055859 | 11.6689 | 82.15 | .0780 | .9104 | .5418 |
| 80 | 229.95 | .055843 | 12.8474 | 90.37 | .0780 | 1.0021 | .5212 |
| 90 | 245.66 | .055931 | 13.7154 | 96.47 | .0780 | 1.0698 | .4952 |
| 100 | 254.75 | .055806 | 14.2171 | 100.00 | .0780 | 1.1091 | .4621 |

THROTTLE 10% OPEN

| | H = 1.1000" | | | | 440° | | | | 710° | | | |
|---|---|---|---|---|---|---|---|---|---|---|---|---|
| N, percent | $W_f$ | $n_v$ | C | (CKn) y | x | h = y/x | $A_f$ (sq. in.) | $b = A_f/h$ | x | h = y/x | $A_f$ (sq. in.) | $b = A_f/h$ |
| 5 | .12 | .90 | .0756 | 1.03183 | 1.11069 | .9290 | .026169 | .05634 | 1.78811 | .5762 | .002718 | .00944 |
| 10 | .24 | .90 | .0703 | .95943 | 1.11856 | .8576 | .012045 | .02809 | 1.79879 | .5331 | .002282 | .00856 |
| 20 | .48 | .89 | .0651 | .87875 | 1.15140 | .7632 | .006446 | .01695 | 1.83053 | .4800 | .001846 | .00769 |
| 30 | .72 | .88 | .0636 | .84858 | 1.20606 | .7036 | .004749 | .01358 | 1.88316 | .4507 | .001638 | .00737 |
| 40 | .96 | .87 | .0630 | .83114 | 1.28480 | .6469 | .003664 | .01330 | 1.93835 | .4284 | .001500 | .00700 |
| 50 | 1.20 | .86 | .0625 | .81784 | 1.40204 | .5832 | .002800 | .00960 | 2.05590 | .3964 | .001310 | .00663 |
| 60 | 1.44 | .84 | .0625 | .79635 | 1.51846 | .5245 | .002206 | .00841 | 2.16340 | .3680 | .001165 | .00633 |
| 70 | 1.68 | .82 | .0625 | .77728 | 1.69600 | .4583 | .001693 | .00739 | 2.30778 | .3324 | .000996 | .00599 |
| 80 | 1.92 | .79 | .0625 | .74889 | 1.87697 | .3989 | .001327 | .00645 | 2.44462 | .3063 | .000883 | .00577 |
| 90 | 2.16 | .75 | .0625 | .71099 | 2.03840 | .3487 | .001071 | .00614 | 2.56186 | .2968 | .000849 | .00564 |
| 100 | 2.46 | .70 | .0625 | .663375 | 2.15100 | .3085 | .000893 | .00579 | 2.62985 | .2523 | .000675 | .00535 |

THROTTLE 100% OPEN

| | H = 1.1000" | | | | 440° | | | | 710° | | | |
|---|---|---|---|---|---|---|---|---|---|---|---|---|
| N, percent | $W_f$ | $n_v$ | C | (CKn) y | x | h = y/x | $A_{t2}$ | $b = A_t/n$ | x | h = y/x | $A_{t2}$ | $b = A_t/h$ |
| 5 | .12 | .90 | .0798 | 1.03183 | 1.10814 | .9312 | .02707 | .05814 | 1.78811 | .5782 | .002742 | .009485 |
| 10 | .24 | .90 | .0791 | .95943 | 1.10822 | .8561 | .01283 | .02951 | 1.78819 | .5365 | .002174 | .008104 |
| 20 | .48 | .89 | .0780 | .87875 | 1.10832 | .7928 | .007652 | .01931 | 1.78839 | .4914 | .001932 | .007863 |
| 30 | .72 | .88 | .0780 | .84858 | 1.10867 | .7654 | .006525 | .01705 | 1.78859 | .4744 | .001805 | .007610 |
| 40 | .96 | .87 | .0780 | .83114 | 1.10897 | .7495 | .005984 | .01600 | 1.78906 | .4646 | .001736 | .007433 |
| 50 | 1.20 | .86 | .0780 | .81784 | 1.10946 | .7372 | .005766 | .01564 | 1.7892 | .4571 | .001680 | .007350 |
| 60 | 1.44 | .84 | .0780 | .79635 | 1.11005 | .7174 | .005079 | .01416 | 1.7895 | .4450 | .001600 | .007214 |
| 70 | 1.68 | .82 | .0780 | .77728 | 1.11065 | .6999 | .004664 | .01353 | 1.7902 | .4342 | .001535 | .007071 |
| 80 | 1.92 | .79 | .0780 | .74889 | 1.11117 | .6738 | .004131 | .01228 | 1.79000 | .4183 | .001438 | .006875 |
| 90 | 2.16 | .75 | .0780 | .71099 | 1.11152 | .6397 | .003523 | .01102 | 1.79112 | .3969 | .001317 | .006636 |
| 100 | 2.46 | .70 | .0780 | .66375 | 1.11196 | .5966 | .002958 | .00992 | 1.7948 | .3696 | .001173 | .006348 |

The value of $y=(H-z)$ can then be computed by subtracting values of $z$ from the constant value of $H$, and from value of $y$ we can compute the value of $h$ for any engine speed, and air density in the air intake manifold. With the value of $h$ thus determined, the corresponding value of $b$ are determined from the equation:

$$A_f = bh/2$$

With the values of the various factors affecting the design of my novel fuel regulator C, determined from Equations 1 to 23 above, we can compile tabulations of these factors as applied to any particular engine. Thus, for an 8 cylinder engine, having a total cylinder displacement, per engine revolution, equal to 331 cu. ins. and a maximum rated speed of 3800 r.p.m., the values of all the factors that determine the design of my fuel regulator C are shown in Tables I, II, III, and IV.

Table I shows the required values of C, $W_f$ and $h$, for optimum operation of the engine when running at part (10%) open throttle, and at full (100%) open throttle; with the temperature $T_m$ of the air in the engine intake manifold at 440°.

Table II shows the same data as Table I, but with the temperature $T_m$ at 710° F. A comparison of the data in Tables I and II shows the effect on the various factors set forth of a change in temperature $T_m$ of from 440° to 710° F., which automotive vehicle carburetors do not take into account.

Tables III and IV show the actual values of the factors set forth, as obtained by the operation of the fuel regulator of my invention.

A comparison of Tables I and II, with Tables III and IV, clearly shows that the fuel regulator of my invention obtains, with mathematical precision, the required quantitative values of fuel flow for optimum performance of the engine under all operating conditions.

In the foregoing disclosure, I have shown and described an embodiment of my invention as applied to piston engine, but it will be readily understood, by those skilled in the art, that the basic philosophy and principles of my invention are also applicable to gas turbine and turbo-jet engines, particularly those having a constant displacement type air compressor. For such use, the fuel pump is geared to the engine, and its fuel output, per engine revolution, is made such as to bear a selected, constant basic ratio the volumetric displacement of the air compressor, per engine revolution, whereby the basic volumetric fuel/air ratio is maintained throughout the range of engine operation. Also the Sylphon bellows is placed in the air passage between the discharge outlet of the compressor and the engine combustion chamber so as to reflect changes in the density of the combustion air. In this way, the fuel flow to the engine can be regulated so as to insure the desired fuel/air ratio in the combustion chamber, under all engine operating conditions.

While I have shown and described the preferred embodiment of my invention, I desire it to be understood that I do not limit it to the precise details of construction disclosed by way of illustration, as these may be changed and modified by those skilled in the art without departing from the spirit of my invention or exceeding the scope of the appended claims.

I claim:

1. A fuel injection system for an internal combustion piston engine, having an air intake manifold for supplying combustion air to said engine, comprising: a fuel supply tank with means for maintaining the fuel therein under the same air pressure $P_m$ as in said manifold, during operation of the engine; a rotary, constant-displacement fuel pump whose output $W_p$ is delivered to a fuel regulator, said fuel regulator having means for automatically dividing, with mathematical precision, the flow of said output $W_p$ into two portions, one of which $W_f$ is the weight of fuel flow injected into said engine under superatmospheric pressure, and said other portion $W_r$ is the weight of fuel flow by-passed around said pump and returned to said fuel supply tank; said regulator including means for regulating the engine fuel flow $W_f$, according to the equation:

$$W_f = CQ\gamma_m$$

where:

C is the required fuel/air mixture ratio (by weight);
Q is the rate of volumetric air flow through the engine, in cubic feet per minute;
$\gamma_m$ is the density of the combustion air in the engine intake manifold, in pounds per cubic feet.

2. A fuel injection system according to claim 1, wherein the fuel regulator has means for regulating the engine fuel flow $W_f$ according to the equation:

$$\frac{W_f}{W_p} = \frac{Ckn_v}{L}$$

where:

$W_p$ is the output of the fuel pump $= W_f + W_r$;
$k$ is the constant ratio of half of the engine piston displacement D to the weight of fuel pump displacement $d$, per engine revolution;
$n_v$ is the volumetric efficiency of the engine as an air pump; and
L is the reciprocal of the density $\gamma_m$.

3. A fuel injection system according to claim 1, wherein the fuel regulator has means for metering the fuel flow $W_f$ to the engine in accordance with the equation:

$$W_f = \frac{A_f \times W_p}{(A_f + A_r)}$$

where:

$A_f$ is the variable flow area of a metering orifice through which the engine fuel flow $W_f$ is passed;
$A_r$ is the constant flow area of a restriction through which the fuel not required by the engine is by-passed around the fuel pump and returned to the fuel supply tank.

4. A fuel injection system according to claim 3, wherein the fuel regulator has means for applying across both the metering orifice $A_f$ and the by-pass orifice $A_r$, the same pressure differential $P_x - P_m$, where $P_x$ is the pressure in said regulator, between an orifice through which the pump output $W_p$ enters said regulator, and said metering orifice $A_f$; and the pressure $P_m$ is the same as that in the engine air intake manifold and in the fuel supply tank, whereby:

$$\frac{A_f}{(A_f \times A_r)} = \frac{W_f}{W_p}$$

5. A fuel injection system according to claim 2, wherein the fuel regulator has a metering valve with a metering orifice of variable flow area $A_f$, said orifice having a length $h$ and a width $b$; said length $h$ being automatically varied in accordance with the linear movement of said metering valve through the same distance $h$.

6. A fuel injection system according to claim 5, having a positioning valve which moves in response to the pump output fuel flow ($W_p$), and which moves the metering valve in accordance with the equation:

$$h = \frac{y}{x}$$

where:

$h$ is the vertical distance through which the metering valve is moved;
$y$ is the vertical distance through which the positioning valve moves in accordance with the fuel flow $W_p$ therethrough, and $y$ is proportional to $Ckn_v$;

$x$ is proportional to $L$, the reciprocal of the density $\gamma_m$ of the air in the engine intake manifold; whereby:

$$\frac{y}{x} = \frac{Ckn_v}{L}$$

7. A fuel injection system according to claim 6, wherein the engine fuel metering orifice $A_f$ is generally triangular in shape and whose flow area $A_f$ is equal to its altitude $h$, times one-half its base width $b$; the altitube $h$ being determined by the vertical movement of said metering valve, and the base width $b$ being its flow area $A_f$ divided by its dimension $h/2$.

8. A fuel injection system according to claim 7, wherein the engine fuel regulator has a positioning valve which moves vertically in response to the pressure differential $P_d$—$P_x$ thereacross;

where:

$P_d$ is the fuel pump discharge pressure; and
$P_x$ is the corresponding lower pressure created by the pressure drop across said positioning valve.

9. A fuel injection sytem according to claim 8, wherein the fuel regulator has a cylindrical Sylphon bellows subject to pressure $P_m$ and temperature $T_m$ of the air in the engine air intake manifold; said bellows having a constant end area and a variable length $L$, which is the reciprocal of the density $\gamma_m$ of the air in the air intake manifold, whereby one moveable end of said bellows travels a distance $x$ proportional to $L$, and transmits a horizontal movement to a linkage mechanism connecting the positionable valve and the fuel metering valve, whereupon said positioning valve transmits to said linkage mechanism a vertical movement $y$ which, when combined by said linkage mechanism with said horizontal movement $x$, results in a vertical movement $h$ of the metering valve.

10. A fuel injection system according to claim 9, wherein the fuel regulator has means for applying across the metering orifice $A_f$ and the by-pass orifice $A_r$, the same fuel pressure differential $P_x$—$P_m$, whereby the ratio of the engine fuel flow $W_f$ to the by-passed fuel flow $W_r$ is in mathematical proportion to the ratio of said orifice areas $A_f/A_r$; and the ratio of engine fuel flow $W_f$ to the pump output flow $W_p$ is also mathematically proportional to the ratio area $A_f$ to the combined areas $A_r + A_f$, i.e., $$W_f/W_r = A_f/(A_f + A_r)$$

irrespective of the magnitude of said pressure differential $P_x/P_m$.

11. A fuel injection system according to claim 7, wherein the fuel regulator has manually operated means, cooperating with the fuel metering valve, for varying the width $h$ of the fuel metering orifice $A_f$, in accordance with selected values of the fuel/air mixture ratio $C$, whereby the engine fuel flow $W_f$ is proportional to any selected value of $C$.

12. A fuel injection system according to claim 11, wherein the engine air intake manifold is connected to an air intake passage supplying combustion air to said manifold; said passage having a manually-operated throttle valve controlling the flow of combustion air to said manifold; a mechanical linkage connecting said throttle valve to the means for varying the width $h$ of metering orifice $A_f$ whereby the area $A_f$ is varied in accordance with the position of said throttle valve, so that the mixture ratio $C$ is maintained at a selected value to meet the operating requirement of the engine.

13. A fuel injection system according to claim 12, wherein said manually-operated means for varying the area $A_f$ of the fuel metering valve orifice may be moved to a position so as to completely close said area $A_f$, whereby the engine fuel flow $W_f$ is reduced to zero, when the engine is not operating, and a desired quantity of fuel is retained in the fuel regulator, available to supplement the normal fuel flow $W_f$ when the combustion air throttle valve is quickly opened to accelerate the engine.

14. A fuel injection system according to claim 4, wherein the fuel regulator has means for hydraulically balancing the fuel metering valve so that it is not affected by variations in the fuel pressure $P_x$ in said regulator.

15. A fuel injection system according to claim 1, including means for distributing the metered fuel from the fuel regulator to each cylinder of the engine in equal proportions.

16. A fuel injection system according to claim 15, wherein the fuel distributing means comprises a fuel reservoir receiving the metered fuel $W_f$, a plurality of conduits, each connecting said reservoir to a cylinder of the engine, whereby an equal portion of said metered fuel is delivered to a cylinder upon the suction stroke of its piston.

17. A fuel injection system according to claim 16, wherein the fuel distributing means includes a rotary distribution disc geared to the engine and adapted to successively establish communication between said reservoir and at least one of the engine cylinders during each revolution of the engine.

18. A fuel injection system according to claim 17, wherein said distribution disc comprises a cut-away portion of an area equal to the flow area through one of the fuel distributing conduits, whereby an exactly equal portion of metered fuel is delivered to the connected cylinder.

19. A fuel injection system for an internal combustion engine comprising a constant-displacement fuel pump for supplying fuel from a tank to said engine; means for dividing the output $W_p$ of such pump into two streams, one of which flows to the engine at a rate $W_f$, and the other flow back to said tank at a rate $W_r$, a variable area metering orifice in the fuel stream $W_f$, and a fixed orifice in the stream $W_r$; means for maintaining a common fuel pressure $P_x$ upstream of both said orifices and a common fuel pressure $P_m$ downstream of both of said orifices, whereby the ratio of fuel flow $W_f/W_r$ is always equal to the ratio $A_f/A_r$ of the orifice areas; first means, responsive to rate $Q$ of volumetric air flow to the engine; second means, responsive to the density $\gamma_m$ of said air flow, and integrating means for varying the orifice area $A_f$ in accordance with the product of $Q$ times $\gamma_m$, whereby the ratio of $W_f/W_r$ is equal to the ratio $A_f/A_r$, under all operating conditions.

References Cited

UNITED STATES PATENTS

| | | | |
|---|---|---|---|
| 2,341,257 | 2/1944 | Wunsch | 123—140.3 X |
| 2,374,844 | 5/1945 | Stokes. | |
| 2,422,808 | 6/1947 | Stokes | 123—119 |
| 2,452,627 | 11/1948 | Barford | 123—119 |
| 2,456,605 | 12/1948 | Wirth et al. | 123—119 |
| 2,598,202 | 5/1952 | Wirth et al. | 123—119 |
| 2,785,669 | 3/1957 | Armstrong | 123—119 |
| 2,856,910 | 10/1958 | Goodridge | 123—119 |
| 2,880,714 | 4/1959 | Clark | 123—140.3 |
| 2,926,646 | 3/1960 | Prentiss | 123—119 |
| 2,957,464 | 10/1960 | Dolza | 123—119 |
| 3,250,262 | 5/1966 | Allen | 123—119 |

LAWRENCE M. GOODRIDGE, *Primary Examiner.*

U.S. Cl. X.R.

123—139